F. W. PETERS.
UNIVERSAL JOINT.
APPLICATION FILED MAR. 10, 1919.
1,360,788.
Patented Nov. 30, 1920.
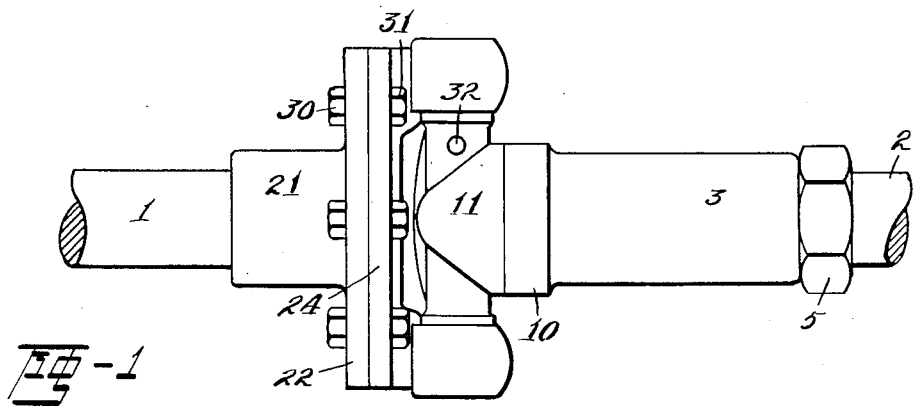
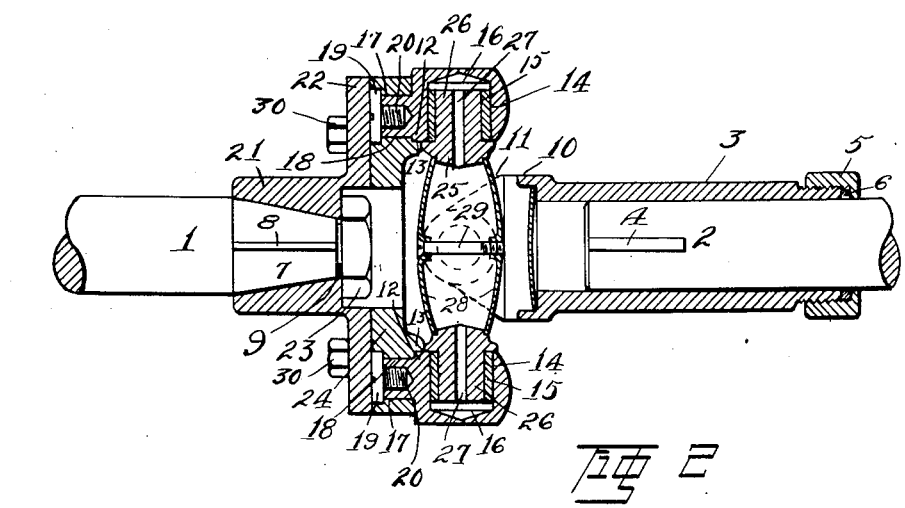
Inventor
Frederick W. Peters
By Hull, Smith, Brock & West
Attys.

UNITED STATES PATENT OFFICE.

FREDERICK W. PETERS, OF WEST PARK, OHIO, ASSIGNOR TO THE PETERS MACHINE AND MANUFACTURING COMPANY, OF CLEVELAND, OHIO, A CORPORATION OF OHIO.

UNIVERSAL JOINT.

1,360,788.  Specification of Letters Patent.  Patented Nov. 30, 1920.

Application filed March 10, 1919. Serial No. 281,747.

*To all whom it may concern:*

Be it known that I, FREDERICK W. PETERS, a citizen of the United States, residing at West Park, in the county of Cuyahoga and State of Ohio, have invented a certain new and useful Improvement in Universal Joints, of which the following is a full, clear, and exact description, reference being had to the accompanying drawings.

This invention relates to universal joints, and has for its object to provide a joint of this character which may be conveniently assembled, and especially in connection with a shaft section having a short, exposed end, as in the case of transmission shafts for automobiles.

In applying these joints to such short exposed shaft ends, it frequently happens that insufficient room is provided for access to certain parts, as, for instance, the studs by which the bearing blocks are secured to the hub flanges. By means of my invention, it is possible to ship the joint in partially assembled condition and to apply the same to a short exposed shaft section without such inconvenience. One manner of accomplishing this result is shown in the drawings forming part hereof, wherein Figure 1 represents a side elevation of a pair of shaft sections connected by my universal joint; and Fig. 2 a central sectional view through the ends of the shaft sections and through the joint.

Describing by reference characters the various parts illustrated herein, 1 denotes the end of a shaft section, which may be a short exposed end—such as the shaft section extending from the transmission gearing of an automobile—and 2 the opposed shaft section. The shaft section 2 is shown as provided with an elongated hub 3 which may be secured thereto as by a long key-way 4 and a gland nut 5 threaded upon the end of the hub and compressing against the shaft a suitable packing 6.

The shaft section 1 is shown as provided with a tapered end having a key-way 8 and a reduced threaded extension 9.

Projecting from the hub 3, and preferably formed integral therewith, is a supporting base 10 having bearing blocks 11. The bearing blocks for both hubs are preferably identical, each block having a face 12 adapted to engage a complementary face or wall 13 on the flange to prevent rotation of the block. Each block is provided with a bore 14 extending outwardly from its inner surface but terminating short of its outer surface. This bore is adapted to receive a bushing 15 and to provide a well 16 therebeyond. Each bearing block is provided with a stud 17 projecting into a bore 18 in its supporting base. This bore is enlarged at its rear portion to provide a recessed seat for the head 19 of a screw bolt 20 which is threaded into a bore provided therefor in the stud 18. The particular manner of supporting and seating the bearing blocks is shown, described and claimed in my application No. 275,503, filed February 7, 1919, the construction providing a flush back for the flanges or supporting bases on the hub 3.

In order to permit this construction to be employed with the hub on the short exposed shaft section 1, I form the hub, indicated at 21, with a circular flanged base 22, the central opening in said base being adapted to receive the threaded end 9 of the shaft section 1 as well as the nut 23 by means of which the hub is secured in place. The hub 21 may be made by or for the manufacturer of the automobile and have the flanged base 22 formed therewith. This hub may be secured upon the end of the shaft 1 by the manufacturer, the flange 22 having a plurality of bolt holes therethrough. The universal joint manufacturer can then ship to the automobile manufacturer an annular companion base 24 having the bearing blocks secured thereto in the manner described and also having therein a cross member comprising the ring 25 having trunnions 26, all of which may be mounted within the bushings 15 and each trunnion having a radial port 27 extending from the inner side of the ring outwardly therethrough and communicating with the well 16, the central space within the ring being inclosable by a pair of plates 28 connected at their centers by a screw bolt 29, to provide a lubricant well from which grease may be distributed by centrifugal action through the ports 27 and wells 16 to the journals for the trunnions provided within the bushings. The hub 3 having the bearing blocks 11 thereon may also be shipped, together with and connected to the base 24 and its bearing blocks, through the cross member and its trunnions. The operator then need only insert the bolts 30 through the openings provided therefor in the base 22 and through the alined openings in the base 24, setting up on the nuts 31. The hub 3 having been slipped along the shaft section 2 during this operation it may be secured in its final position.

Where the automobile manufacturer does not furnish the hub 21, this hub may be connected to the base 24 and the parts shipped as before, but with the plates 28 removed. This will enable the assembler to apply the hub 21 to the end of its shaft section, insert a socket wrench through the interior of the ring 25, and secure the hub in place by means of the nut 23. The concavo-convex plates 28 may then be applied to their seats in the ring and clamped together by means of the bolt 29, thus providing the internal lubricant chamber. The rear face of the base 24 is flush (by reason of the manner of securing the bearing blocks thereto) and this enables the base 24 to be secured to the base 22 with their complementary faces in close engagement, so that a solid connection may be effected between such bases. The ring 25 is provided with an opening for the insertion of the lubricant thereinto, said opening being closable by a plug 32.

Having thus described my invention, what I claim is:—

1. The combination, with a shaft section, of a hub adapted to be slipped upon such shaft section and having an opening for the end thereof and a base extending outwardly from said opening, a second hub, bearings carried thereby, a cross member comprising an open ring having trunnions projecting therefrom, one pair of said trunnions being journaled in said bearings, a ring, bearings connected to said ring and adapted to be journaled upon the other pair of trunnions, means for securing the second ring to the base of the first mentioned hub, means within the opening in the first hub for connecting the same to the said shaft section, plates adapted to be applied to opposite sides of the first mentioned ring to provide a lubricant chamber in the central portion thereof, means for connecting the central portions of said plates thereby to provide a lubricant well within the first mentioned ring, and ports for conducting lubricant from said well to said bearings.

2. The combination, with a shaft section having a threaded end, of a hub adapted to be slipped upon such shaft section and having an opening for such threaded end and a circular base extending outwardly from said opening, a second hub, bearings carried thereby, a cross member comprising an open ring having trunnions projecting therefrom, one pair of said trunnions being journaled in said bearings, a ring, bearing blocks connected to said ring and adapted to be journaled upon the other pair of trunnions, means for securing the second ring to the circular base projecting from the first mentioned hub, a nut for the threaded end of said shaft section, and plates adapted to be applied to opposite sides of said first mentioned ring to provide a lubricant chamber in the central portion thereof, means for connecting the central portions of said plates thereby, and ports for conducting lubricant from said chamber to said bearings.

3. The combination, with a shaft section, of a hub adapted to be applied to such shaft section, a base or flange projecting outwardly from said hub, a second hub having bearings, a cross member comprising a ring having trunnions projecting therefrom, one pair of said trunnions being journaled in said bearings, a base member coöperating with the base member on the first mentioned hub, bearing blocks on the last mentioned member and having studs projecting into bores therein, means for securing said bearing blocks to the last mentioned member to provide a flush construction for the rear face thereof, and bolts for securing the said base members together.

4. The combination, with a shaft section having a threaded end, of a hub adapted to be applied to such shaft section and having a central opening for the reception of such threaded end, a base or flange projecting outwardly from said hub, a second hub having bearings, a cross member comprising a ring having trunnions projecting therefrom, one pair of said trunnions being journaled in said bearings, a base member coöperating with the base member on the first mentioned hub, bearing blocks on the last mentioned member and having studs projecting into bores therein, means for securing said bearing blocks to the last mentioned member to provide a flush construction for the rear face thereof, bolts for securing the said base members together, plates adapted to coöperate with opposite sides of said ring, a bolt connecting the central portions of said plates to provide a well for lubricant therewithin, and ports for conducting lubricant from said well to the trunnion bearings.

5. In a universal joint, the combination of a hub having a flange projecting therefrom, a base member having a face coöperating with the front face of said flange, bearing blocks each having a stud projecting into a bore provided therefor in the said base member, means located within the rear face of said member and coöperating with said studs to draw said blocks each to a seat, and means for connecting the said flange and the said member with their front and rear faces respectively in substantial engagement.

In testimony whereof, I hereunto affix my signature.

FREDERICK W. PETERS.